United States Patent [19]

Garcia et al.

[11] Patent Number: 5,228,655
[45] Date of Patent: Jul. 20, 1993

[54] WRIST REST SUPPORT FOR A COMPUTER USER

[76] Inventors: James M. Garcia, 1619 Blossom Hill Rd., San Jose, Calif. 95124; Louis A. Morrone, 5633 Goldfield Dr., San Jose, Calif. 95112; Robert S. Smith, 1263 Emory St., San Jose, Calif. 95126

[21] Appl. No.: 873,468

[22] Filed: Apr. 24, 1992

Related U.S. Application Data

[63] Continuation of Ser. No. 698,495, Apr. 26, 1991, Pat. No. 5,131,614, which is a continuation-in-part of Ser. No. 594,390, Oct. 1, 1990, abandoned.

[51] Int. Cl.⁵ .......................................... B43L 15/00
[52] U.S. Cl. ................................... 248/118; 248/918; 400/715
[58] Field of Search ................ 248/118, 118.1, 118.3, 248/118.5, 918, 345.1; 400/715; 279/219, 220, 225, 218, 229; 5/636, 630, 646, 419

[56] References Cited

U.S. PATENT DOCUMENTS

| 2,720,660 | 10/1955 | Smith | 5/636 |
| 2,772,725 | 12/1956 | Leasure | 297/219 |
| 4,194,254 | 3/1980 | Torrez | 5/652 X |
| 4,726,085 | 2/1988 | Antonio | 5/636 X |
| 4,786,103 | 11/1988 | Selbert | 297/219 X |
| 5,029,350 | 7/1991 | Edelson | 297/229 X |

FOREIGN PATENT DOCUMENTS 3220336 12/1983 Fed. Rep. of Germany .......... 5/636

*Primary Examiner*—Alvin C. Chin-Shue
*Attorney, Agent, or Firm*—Robert Samuel Smith

[57] ABSTRACT

A wrist rest support for supporting a users wrist when he is performing tasks involving repetitive motion with the hands and fingers such as operating a computer keyboard or computer mouse which includes a base pad that is positioned partially under the keyboard and includes a section extending away from the keyboard that has a top surface above the level of the keys for supporting the wrists. The pad features an antistatic fabric lamisection that is separable from a base section when it is desired to substitute another riser section of different dimensions.

6 Claims, 1 Drawing Sheet

WRIST REST SUPPORT FOR A COMPUTER USER

BACKGROUND

Cross Reference to Prior Applications

This application is a continuation of application Ser. No. 698,495 filed Apr. 26, 1991, now U.S. Pat. No. 5,131,614 issued Jul. 21, 1992, which, in turn, is a continuation-in-part of application Ser. No. 594,390 filed Oct. 1, 1990, abandoned.

FIELD OF THE INVENTION

This invention relates to wrist rests and particularly to a wrist rest support for use with devices including the key board of a computer and a computer "mouse" during the use of which the user is exposed to repetitive motion stress.

In recent years the growing use of keyboards such as used with personal computers has led to widespread incidence of disorders that afflict large numbers of office personnel. These disorders include aching shoulders and neck and particularly a problem with the wrist and hands known as carpal tunnel syndrome. Carpal Tunnel Syndrome is numbness, tingling and loss of strength of the hands and wrist that result from long hours of repetitive motion with the hands and fingers such as typing at the keyboard or manipulating a computer "mouse". In view of these problems a number of devices have been disclosed which are intended to support the hands and wrists while typing and to absorb the troublesome vibrations generated by the typing action.

A forerunner of these devices is disclosed in U.S. Pat. No. 2,694,026 to Johnson for a pad of thick firm felt laminated to a thin rubber mat. However, this device was intended solely to support typewriters and other office equipment and made no provisions for supporting the users wrists. Furthermore, since the device provided direct support only for the machine (not the wrists), design of the pad composition, i.e., thick firm felt laminated to a thin sheet of sponge rubber) was predicated strictly for that purpose. The purpose of the thick felt is to absorb the vibrations whereas the sponge rubber laminated to the bottom (and for some purposes, to the top) of the felt is intended to prevent slippage of the machine.

U.S. Pat. No. 4,621,781 to Springer is for an adjustable metal base that supports both the keyboard and a foam pad wrist support. "The support means, e.g., the base plate preferably includes stop means, e.g., a flange abutting the work surface on which the keyboard rests to prevent sliding movement of the forearm rest."—"-The cushion comprises a self-skinning urethane pad which comprises an outer skin 25 and an inner foam material 26 secured to the metal backing plate." "Self skinning urethane pad" refers to the property of molded foams to develop a skin of higher density than the interior of the cast foam during the molding process. The skin develops because the surface region of the foam in the mold cools at a greater rate than the interior of the foam. Such a skin developed as part of the foam is not particularly comfortable to the skin of the user since it is a region (skin) of stiff, hard plastic.

U.S. patent to Scantlebury is for a safety crash pad that includes hardware for attachment of a pad to the dashboard of a vehicle. The pad includes an outer jacket 28 which encloses foam rubber. The pad is not designed for use as a wrist support so that selection of the composition of the pad is not based on a consideration of comfort on repeated contact but is designed to protect against inadvertent tearing, puncturing, rupturing, etc. Therefore, the pad includes a "resilient body (sponge rubber) that is preferably closely enveloped in a jacket 28 of any highly flexible yet tough fabric such a light weight canvas textile that may be rubberized to make it better capable of withstanding an explosive burst of air if forced out of the cells of the sponge rubber material of the body when the latter is subject to a compressive blow." The use of a light canvas is definitely not selected to provide comfort to the touch.

THE INVENTION

Objects

It is an object of this invention to provide a wrist rest support to an operator typing on the keyboard of a computer.

It is a another object that the wrists be maintained in a neutral or unflexed position and that vibration from typing be deadened in order to avoid stresses that lead to repetitive motion disorders such as carpal tunnel syndrome and stiffness of the neck and shoulders.

It is another object that means be provided for supporting the users wrists at a height above the keyboard which is most suitable for the user, depending on his/her size.

It is another object that the "feel" of the support against the wrists be comfortable in that vibrations not be transmitted from the keyboard through the support to the wrists and that the device be soft to the touch of the wrists.

It is another object that the support be readily installed under (or removed from) the standard keyboard.

It is another object that the construction of the support be inexpensive.

These and other objects will be apparent to the reader after reading the following description and studying the drawings.

SUMMARY

This invention is directed toward a wrist rest support having sections of different thicknesses in which one section is under the key board of the computer and the second section extends away from the key board to where the user may support his wrists while typing. The wrist rest section is specially contoured to support the wrists in a manner that eliminates stresses leading to repetitive motion stress syndrome. According to one embodiment, a portion of the wrist rest section is detachable providing that a wrist rest may be selected and attached to a base pad that is best suited to the size of the user. The composition of the support is selected to minimize vibrations emanating from the keyboard. Antistatic properties are conferred on the support to prevent destruction of valuable data or programs by inadvertent contact with magnetic recording disks.

DRAWINGS

DESCRIPTION OF THE PREFERRED EMBODIMENT

The following detailed description illustrates the invention by way of example not by way of limitation of the principles of the invention. This description will clearly enable one skilled in the art to make and use the invention and describes an embodiment which I believe is the best mode for carrying out the invention.

Figure 2:
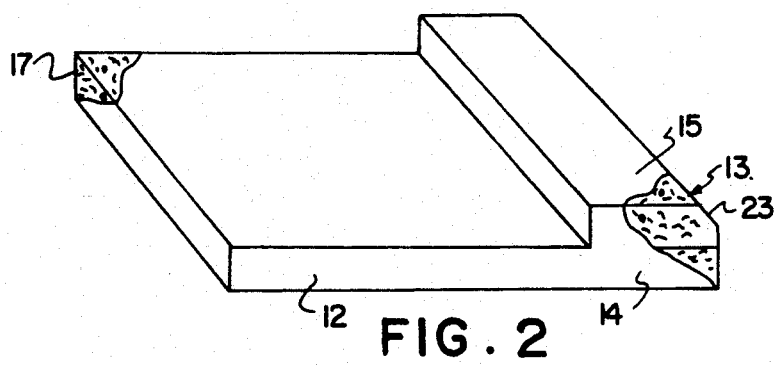
FIG. 2 shows in perspective a second embodiment of the invention in which the riser is permanently attached to the base pad.
Figure 1:
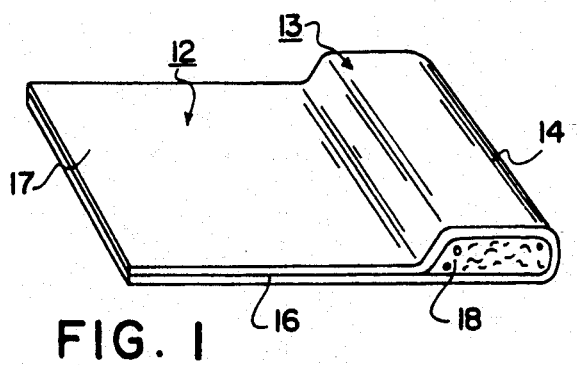
FIG. 1 shows one embodiment of this invention in perspective using fabric as a base pad.
Figure 3:
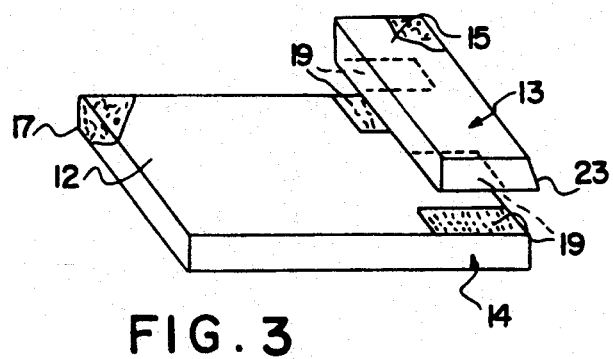
FIG. 3 shows in perspective a third embodiment of the invention in which the riser is detachable from the base pad.

Turning now to a discussion of the drawings, there are shown in FIG. 1, FIG. 2 and FIG. 3, perspective views of three embodiments of this invention.

All three embodiments include a base pad having a device support section 12, on which the keyboard or "mouse" is placed, continuous with a wrist support section 14. In all three embodiments, the entire base pad is placed on a table or desk top. Therefore, the need for an additional rigid support which may extend away from the desk top or table such as described in the prior art is eliminated and greater economy of construction is achieved.

In the embodiment shown in FIG. 1, the base pad is a sheet of fabric 16 wrapped around a foam slab 18 so as to provide the thick wrist rest section 13 (the section of fabric wrapped around the foam) from which extends the all fabric section 12 on which the keyboard is placed. This design is the least expensive embodiment and is most appealing in locations such as schools where a large number of wrist supports must be purchased and cost is an important consideration. However, the all-fabric base is not as effective in absorbing the vibrational energy from typing on the key board as the embodiments shown in FIGS. 2 and 3.

In the embodiments shown in FIGS. 2 and 3, the support includes a base pad 17 that is positioned under the entire bottom area of the keyboard and extends from in front of the keyboard to provide a base on which a riser 15 is placed thereby providing the wrist rest section 13.

As shown in FIG. 2 the greater thickness of wrist rest section 13 can be achieved by permanent attachment of a riser 15 to section 14 of the base pad. Permanent attachment of the riser 15 to the base pad can be accomplished using any one of several techiques such as molding the entire base pad with riser 15 in one piece or by gluing a riser 15 to section 14 of the base pad. Permanent attachment of the riser 15 is desireable when it is intended to avoid such inconveniences as misplacement of the riser.

FIG. 3 shows another embodiment in which a riser 15 is nonpermanently attached to section 14 using VELCRO patches 19 on the interface between the base pad and riser. Of course the VELCRO TM need not cover the entire interface but simply cover the interface over an area extending in about one inch from either end of the riser 15.

Figure 4:
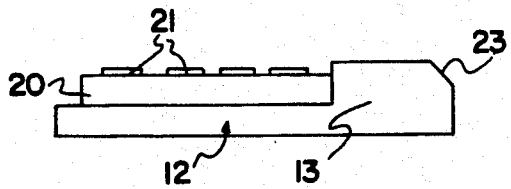
FIG. 4 is a partial end view showing the relation of the height of the riser to the tops of the keys on the keyboard.

FIG. 4 shows a cutaway elevated side view illustrating that in all of the embodiments, wrist rest section 13 on which the wrists are supported is higher than the tops 21 of the keyboard 20 supported on device support section 12. This difference in height serves two purposes.

First, it provides a positioning stop for the key board so that the pad does not slide under the keyboard such as can otherwise result from the vibrations of the typing if there were no step.

Secondly, height of the wrist support above the keyboard has been carefully selected as a result of a study by the inventors in consulatation with medical specialists in the field which show that supporting the wrists in this position maintains an angle between the wrist and hand while typing which minimizes strain on the wrist thereby preventing repetitive motion strain syndrome. A bevel 23 on the top leading edge of the wrist rest section 13 further minmizes wrist strain. The detachable riser 15 shown in FIG. 3 offers several advantages.

One advantage is that risers of various thicknesses may be made available to the user from which he may select a riser 13 having a height and/or width that best suits his needs. For example, a user with large hands will require a higher pad than a user with small hands.

Another advantage is that every user can have his/her personal riser 15 which he/she may attach to the base pad when he/she uses the keyboard and retrieves when he/she is finished. This is a particularly valuable advantage for workers in health centers, schools and other public institutions where it is desired to minimize the spread of viral diseases (colds, influenza, etc.) by contact. It is well known that viral diseases are spread by depositing the viruses on surfaces by sneezing, coughing, etc., after which another person picks up the virus by contact of the contaminated surface with his hands.

In the embodiments of FIGS. 2 and 3, the base pad 17 is preferably a flexible foam. The foam should have intermediate firmness in order to be most effective in absorbing vibrations from the keyboard. There are numerous types of foam on the market, e.g., rubber, urethane, polyester, and each of these foams can be formulated in a manner to possess the degree of intermediate firmness required to deaden vibrations from the keyboard.

In the embodiment of either FIGS. 2 or 3, the foam used in the riser may have a hardness which is, e.g., firm and different than the hardness of the foam of the base pad which is selected to be intermediate firm. The firmness of the base pad is selected to dampen vibrations of the typing operation through the fingers while the firmness of the wrist rest pad is selected for comfort according to the desires of the use.

Figure 6:
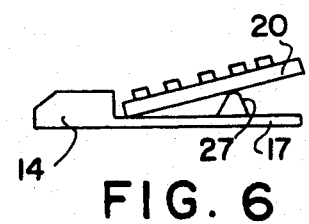
FIG. 6 shows a foam lift that is placed between the bottom of the keyboard and the base pad thereby avoiding tansmittal of keyboard punching up through the fingers.

Another feature of the invention incorporated to deaden direct transmission of vibrations from the keyboard through the fingers is the positioning of a lift 27 between the keyboard and pad as shown in FIG. 6. The triangular shape of the lift ensures that only the top edge of the lift is in contact with the keyboard and this construction has been found to very strongly dampen vibrations from the keyboard.

The two features of the lift together with a base pad extending entirely under the device marks a major improvement over devices of the prior art where the keyboard is in direct contact with a metal base of a tray extension.

In the preferred embodiment, fabric 16 is laminated to at least the top surface and sides of the foam pad. The fabric 16 is illustrated in FIGS. 2 and 3 by being partially cutaway from the underlying foam base pad 17 and foam riser 15. The fabric can be laminated to the foam surface using, e.g., any one of a number of sprayed contact cements that are on the market.

The fabric 16 serves four purposes.

One purpose is that it improves the appearance of the support. Foams are available in only a limited number of solid colors, generally black, cream and grey. The fabric 16 laminated to the foam in this invention can be selected from a much wider range of colors and designs to match the surroundings and convert the work space to a more attractive area.

Furthermore, it is an additional embodiment that the fabric 16 can be embossed such as with a personalized message to add an even more congenial and attractive atmosphere to the workplace whereas foam is not readily decorated.

The second purpose of the fabric is to make the wrist support more comfortable to the touch or feel of the skin. A fabric having the feel similar to felt as cover for the foam is the preferred for this invention because it has a "cozy" feeling on the bare wrists.

By covering the foam pad with a fabric, the user has both the sensation of resilient support from the pad and a felt-like feeling against the skin in contrast to, e.g., a thick felt pad where there would be insufficient resiliency or a pad that is entirely foam which would not feel as comfortable against the skin.

The third purpose of the fabric laminated surface is to provide a better wearing surface than can be provided by a number of other types of surfaces such as felt or foam. Foam surfaces can fragment since foam does not inherently have the tensile strength that characterizes the fabric of choice. Felt surfaces tends to form woolen balls on its surface after rubbing the surface for several working days.

Investigation by the inventors have disclosed that the best material for the application of this invention is a knitted fabric having a nap and a composition that is ten percent polyester and 90 percent acetate. This fabric is sold under the trade name ROBE VELOR ™ by New York Fabrics, a chain of stores one of which is located on Blossom Hill Rd. in San Jose, Ca.

The fourth reason for laminating a fabric to the foam base is that the fabric can be readily made permanently antistatic. This is a very valuable embodiment since, otherwise, data and/or programs stored on magnetic memory disks can be erased if the disk is inadvertently laid on a wrist rest that is not antistatic.

The fabric covering the pad can be rendered antistatic according to a process developed by the inventor which is an embodiment of this invention. According to this method, the cloth is dipped in an antistatic solution and allowed to dry. The antistatic solution is an aquaous emulsion of a polymer such as polyvinyl chloride or polyvinyl acetate and a quaternary amine (typically, ten parts polymer to one to four parts quaternary amine) in sufficient water base to thoroughly saturate the fabric. The fabric is dipped in the solution and then simply permitted to air dry. There are products such as antistatic sprays on the market that are used, e.g., in the laundryroom on clothes that can be applied to the wrist support and application of these alternative antistatic solutions are an embodiment of this invention when used on the wrist support of this invention. However the preferred treatment is the one suggested supra because of its permanent character.

Generally speaking, foam is covered with vinyls and other plastic sheet coverings for some applications such as for automobile dash boards (see BACKGROUND) where the selection of the laminating material is for a different application such as protection against crashes and does not anticipate the uses and requirements of the present invention. Fabric is also used to cover foam to provide seat cushions for furniture. However, in contrast to the present invention, the practice is not to permanently laminate the fabric to the foam in this application in order that the cushion can be readily deformed then assume its original shape without straining or tearing the foam or fabric when the furniture is in use.

Although the principles of this invention have been applied to the situation of a user typing on a keyboard, it will be recognised that the these same principles may be applied to supporting the wrist while using related devices such as the "mouse" that is used with computers or a laptop computer. The wrist support for a mouse board will be smaller and the area of the base pad on which the mouse is moved has a composition that is more amenable to rolling the ball of the mouse on its surface while the user is supporting his wrist on the wrist portion of the pad. For this application, the riser may be the fabric covered construction described above whereas the base pad on which the mouse is rolled may be covered with a vinyl (which is harder than fabric) or even a solid board of rigid plastic.

The riser would be attached to the base board using VELCRO as described above.

Figure 5B:
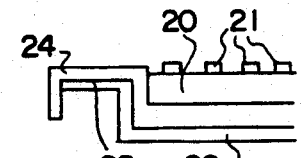
FIG. 5a and 5b are partial end views of a wrist support for a work station with a front extension.
Figure 5A:
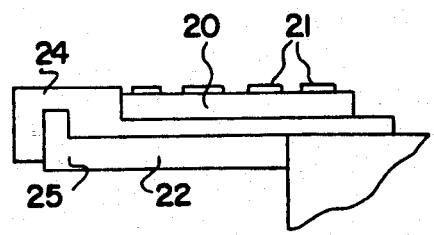

As shown in the partial view of FIG. 5a and 5b, some computer work stations have a metal extension 22 out from in front of the keyboard that have a ledge 25. Some of these ledges are broad as hown in FIG. 5b and some are more narrow as shown in FIG. 5a. Although these extensions have ledges 25 that are intended to provide support to the wrists, workers find the shelves uncomfortable after periods of use because the shelves are hard. An embodiment of this invention is a fabric covered extension contoured to conform to the ledge and having the same structural features as described in the foregoing paragraphs.

In the foregoing paragraphs, several embodiments have been described which meet the objects of the invention. These embodiments provide comfortable support for the wrists in positions which avoid the occurence of repetitive motion stress in the wrists and shoulders. The problem of avoiding spread of viral diseases has also been satisfactoriy addressed. The embodiments also provide for improved personal reaction to working in the workplace by constructions that are amenable to attractive decoration and promoting the personal comfort of the user. The principles of the invention are also applicable to other uses such as a wrist support for a computer "mouse" or a laptop computer.

It should be noted that various modifications within the scope of the invention can be made by one of ordinary skill without departing from the spirit thereof. I therefore wish my invention to be defined by the scope of the appended claims as broadly as the prior art will permit and in view of the specification if need be.

We claim:

1. A method for relieving repetitive motion stress on wrists of a user while using a device on a work station wherein using said device requires repetitive motion of the fingers and hands, said devices including a keyboard, mouse of a computer and laptop computer, said method including the steps:

positioning on a surface of said work station a relief means including a resilient slab having a substantially parallelopiped shape with an elongated length and elongated edge, a width and a height, a fabric wrapped around said edge and folded back over said fabric thereby forming a device support section of said relieving means comprising two layers of said fabric and a wrist support section of said relieving means comprising fabric wrapped around said resilient slab with said edge distal from said device support section and wherein said height has a value selected to positon said wrists above said device when said device is positioned on said device support section and said wrists are supported on said wrist support section;

positioning said device on said device support section;

positioning user's wrists on said wrist support section; using said device.

2. A method as in claim 1 wherein said fabric is antistatic.

3. A method as in claim 1 wherein said edge is bevelled.

4. A method as in claim 1 wherein said two layers include a top layer having a top surface which contacts said device and a bottom layer having a bottom surface which contacts said work surface and said device support section comprises a resilient pad in contact with a surface of said top layer opposite said top surface.

5. A method as in claim 4 wherein said pad is plastic foam.

6. A method as in claim 4 wherein said work surface includes a surface of an extension from a work table top and has a ledge and said pad has a shape configured to conform to said surface of said extension with said ledge.

* * * * *